UNITED STATES PATENT OFFICE.

FRANK E. DARROW, OF BRISTOL, CONNECTICUT.

IMPROVED PROCESS FOR MANUFACTURING DOLLS.

Specification forming part of Letters Patent No. 54,301, dated May 1, 1866.

*To all whom it may concern:*

Be it known that I, FRANK E. DARROW, of Bristol, county of Hartford, and State of Connecticut, have invented certain new and useful Improvements in the Process of Manufacturing Dolls, &c., from Rawhide; and I do hereby declare that the same is described in the following specification, so as to enable others skilled in the art to make or pursue the same, the nature of which consists in the employment of any suitable liquid by the use of which the rawhide is saturated or steamed just as it is about to be introduced into the die and press and pressed into shape, and will perfectly retain the shape given it by the mold.

The process is simply as follows: The rawhide is first cured in the usual way. It is then cut into blanks of suitable size for the purpose desired. Then take a box of concentrated lye, (about one pound, usually found in stores for sale,) put it into about two gallons of water, then place said blanks in a suitable apparatus into which steam made from said composition or liquid may enter, and thereby saturate or steam said blanks, when they may be taken therefrom, one at a time, and introduced to the die and press, and pressed into the desired form or shape. When taken therefrom it will be hard and perfectly retain its shape or form into which it has been pressed while in its flexible or elastic state. There may be other liquids by means of which this effect may be produced.

The particular object of saturating or steaming is to produce an elastic or flexible state of the rawhide during only the time occupied in pressing it into its mold or die.

I have found by the use of alcohol the same result may be produced; but it will be seen that it is too expensive. I therefore believe that the process particularly described will be found to be the best and cheapest.

I believe I have described the process so as to enable others skilled to use the same to produce the same effect.

What I claim, therefore, and desire to secure by Letters Patent, is—

The process of saturating rawhide for forming it into a desired form or shape, substantially in the manner, as and for the purpose described.

FRANK E. DARROW. [L. S.]

Witnesses:
LEONARD BLAKESLEE,
BENJ. F. HAWLEY.